US008884819B2

(12) United States Patent
Wu

(10) Patent No.: US 8,884,819 B2
(45) Date of Patent: Nov. 11, 2014

(54) DIRECTIONAL ANTENNAS AND ANTENNA SELECTION FOR WIRELESS TERMINAL

(75) Inventor: Shiquan Wu, Ottawa (CA)

(73) Assignee: Shiquan Wu, Ottawa (CA)

(*) Notice: Subject to any disclaimer, the term of this patent is extended or adjusted under 35 U.S.C. 154(b) by 178 days.

(21) Appl. No.: 13/137,548

(22) Filed: Aug. 25, 2011

(65) Prior Publication Data
US 2012/0050105 A1 Mar. 1, 2012

Related U.S. Application Data

(60) Provisional application No. 61/344,626, filed on Sep. 1, 2010.

(51) Int. Cl.
H04B 7/00 (2006.01)
G01S 5/04 (2006.01)
H04B 7/06 (2006.01)

(52) U.S. Cl.
CPC .................. H04B 7/0602 (2013.01)
USPC ......................... 342/367; 342/445

(58) Field of Classification Search
USPC ............ 342/367, 417, 422, 437, 445; 455/151.1, 277.1
See application file for complete search history.

(56) References Cited

U.S. PATENT DOCUMENTS 3,490,024 A * 1/1970 Lorenz et al. ............... 342/418
6,697,610 B1 * 2/2004 Tait .......................... 455/277.1

* cited by examiner

Primary Examiner — Dao Phan
(74) Attorney, Agent, or Firm — Gowling Lafleur & Henderson LLP

(57) ABSTRACT

This invention discloses directional antenna systems, antenna combining and transmission antenna selection mechanism for wireless communication terminals such mobile handsets, mobile embedded laptops, mobile CPEs (Customer premises equipment), nomadic wireless CPEs, fixed wireless terminals and etc. The disclosed systems and methods only require analog circuitry and compass readings therefore are easy to implement and well fit into the current wireless terminals architectures. The inventive systems and methods resolve the problem that a directional antenna may not receive properly when user turn around and the antenna direction is deviated from transmitter; the inventive systems and methods further reduce the interference caused by omni antenna systems by selecting a directional antenna for transmit.

20 Claims, 6 Drawing Sheets

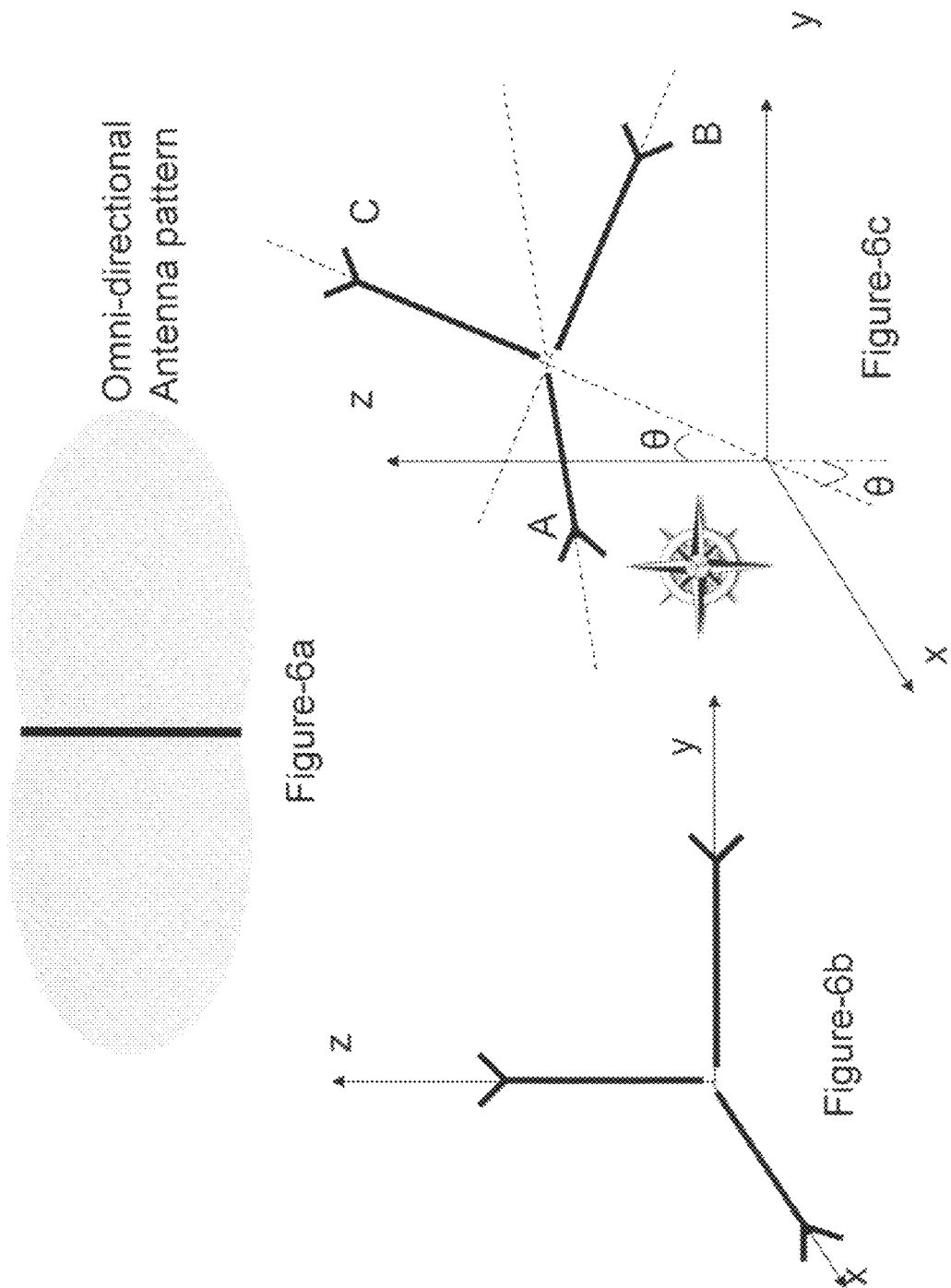

DIRECTIONAL ANTENNAS AND ANTENNA SELECTION FOR WIRELESS TERMINAL

CLAIM OF PRIORITY

This patent application claims the benefit of priority from U.S. Provisional Patent Application No. U.S. 61/344,626 filed on Sep. 1, 2010. This application incorporates by reference the entire disclosure of U.S.A. Provisional Patent Application No. U.S. 61/344,626.

FIELD OF THE INVENTION

The embodiments of the invention relate generally to mobile wireless terminal antennas system and antenna selection for transmission.

BACKGROUND OF THE INVENTION

In recent years, wireless communication advances rapidly. There are many wireless products developed under many wireless standards. Those standards include cellular standards such as GSM (Global System for Mobile), IS-95 (Interim Standard 95)/CDMA2000 (Code Division Multiple Access 2000), 3GPP/UMTS/LTE, WiMax/IEEE 802.16e and local area networks standards such as WiFi/IEEE 802.11, BlueTooth, Zigbee, and UWB/IEEE 802.15 etc.

In terms of the bi-directional wireless communication, wireless system can also be simply categorized as FDD (frequency division duplex) and TDD (time division duplex). Two way communications use two different frequencies in FDD system and use the same frequency but different time slots in TDD system.

In general, a wireless communication system has four major subsystems, i.e. antenna system, radio system, base-band processing subsystem and MAC processor. Their responsibilities are:

Antenna is responsible to pick a signal or to radiate a signal;

Radio system will select and regulate the interested signal coming down from an antenna or regulate the signal from base-band subsystem before it goes to the air;

Base-band processing subsystem is the place the messages get processed such as encoding/decoding, modulation/demodulation, encryption/decryption, filtering etc.;

MAC (media access control) will re-format the messages properly either suitable for transmission or suitable for reception.

Apparently, antenna system is a critical element and determines the signal quality in the first place.

Most of the mobile wireless terminals today installed an omni-directional antenna with the pre-determined performance.

Omni directional means the antenna transmits and receives from all the directions except along the antenna line. On the other hand, most cellular networks deployed today have 3 sectors topology with directional antennas usually mounted on a cellular tower. Omni antennas not only cause significant interferences to neighbor users, but also cause signal energy diverse therefore waste terminal battery.

Pre-determined performance means that the user can hardly do anything on antenna performance.

So there is a need to implement directional antenna in mobile wireless terminal side to minimize the interferences and to align with cellular network topology so that the uplink (terminal transmits and base station receives) link budget can be balanced with that of downlink (base station transmits and terminal receives). However, to implement directional antennas is difficult both in technology implementation and in cost effectiveness. When a directional antenna is implemented, it must guarantee those system information such as broadcast information, paging information etc (can arrive from any direction) still can be heard. It also needs to guarantee the existing terminal architecture and form factor a minimum change.

One embodiment of this invention is to disclose directional antennas systems and apparatus for wireless terminals and handhelds.

Another embodiment of the invention is to provide directional transmission antenna selection schemes basing on a simple compass reading.

The foregoing embodiments of the invention are illustrative that can be implemented by the various exemplary embodiments and the corresponding descriptions. It will be appreciated by those skilled in the art that these and other embodiments can be modified for other wireless devices antennas configurations.

SUMMARY OF THE INVENTION

Most of the mobile terminals use omni-directional antennas. By contrary, most of the cellular tower has directional/sector antennas. Therefore, when mobile terminal communicates with its base station, it not only radiates signal towards the desired base station, but also radiate energy to all other unrelated base stations which cause interferences and energy waste.

The object of this invention is to propose a directional antennas system, apparatus and antenna selection schemes to resolve the aforementioned problems.

The advantage of the invented system and schemes resides in the fact that the implementation is simple, cost effective and has no system architecture and standard changes for the current mobile phones.

Another advantage of the invention resides in the fact that the directional transmission is achieved without using base-band or decoded information. Therefore network level interferences will be reduced and battery life can be prolonged.

Yet another advantage of the invention is to reduce the mobile signal loss due to antenna orientation when moving or improper holding.

DESCRIPTION OF DRAWINGS

Further advantages of the invention can be seen from the illustrated embodiments, drawings and claims. Individual advantages and characteristics can be embodied individually and on their own or in groups or in any combination of several units.

FIG. 6A-6C shows yet another embodiment of the invention, wherein 3 omni-directional antennas are oriented along 3 orthogonal axes z, x and y.

DETAILED DESCRIPTION OF THE INVENTION

Figure 1:
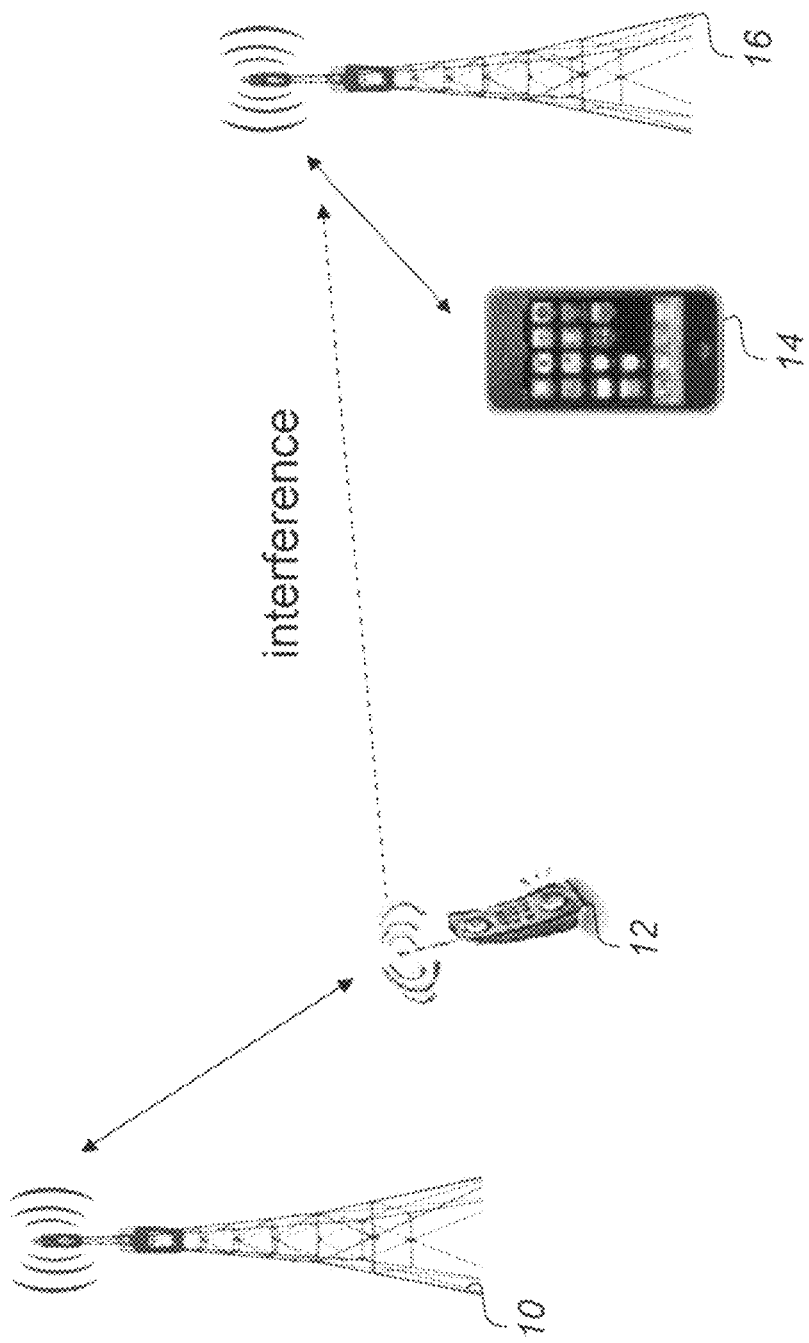
FIG. 1 shows a scenario of omni-directional antenna causes interference to another communication.
Figure 2:
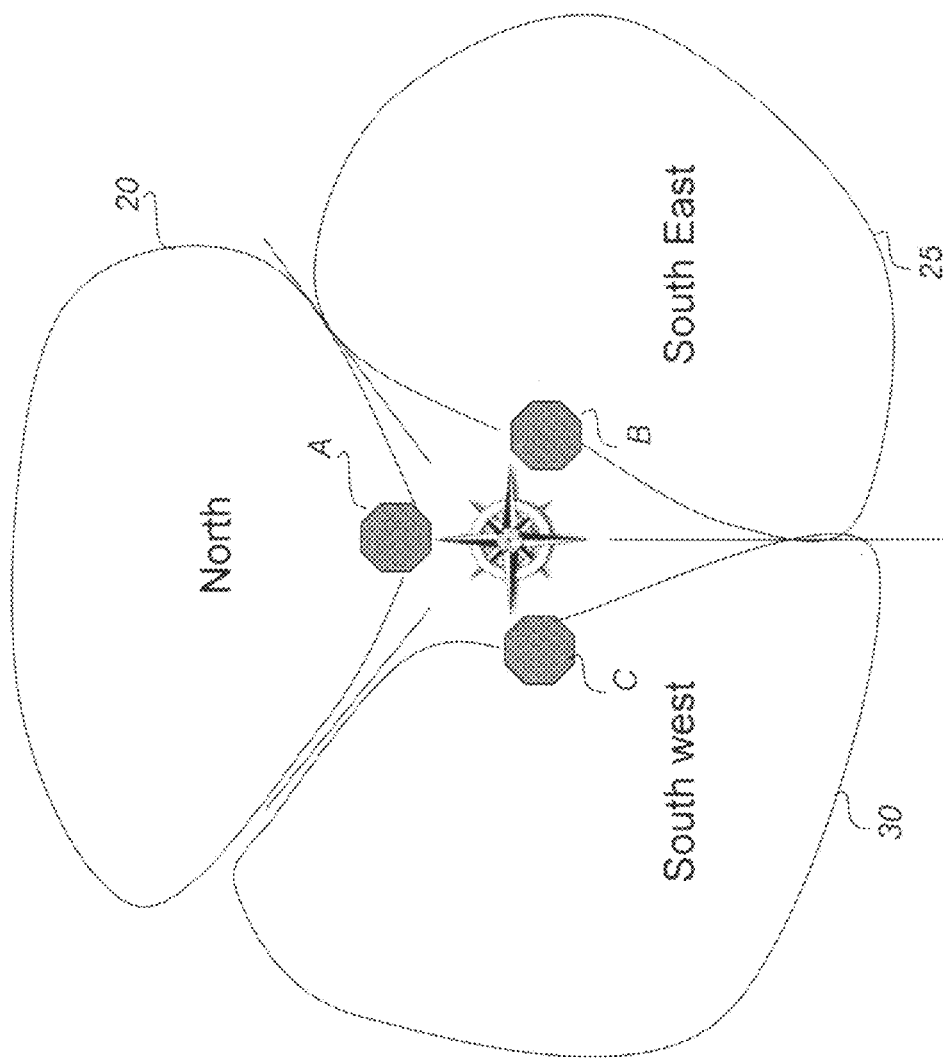
FIG. 2 There are 3 illustrated directional antennas for wireless terminal and each antenna responsible for a space about 120 degrees.

Refer to FIG. 2, there is an illustrated embodiment, wherein 3 directional antennas A, B and C and a digital compass. Antenna A is facing to the north aligned with the compass north pole and covers a space of 120 degrees; Antenna B is facing South East and covers another 120 degrees space; Antenna C is facing South West and covers another 120 degrees space. All 3 antennas together will be equivalent to an omni-directional antenna and they are ordered in clockwise.

For FDD system, mobile terminals transmit and receive at different frequencies and therefore may occurs simultaneously.

Figure 3:
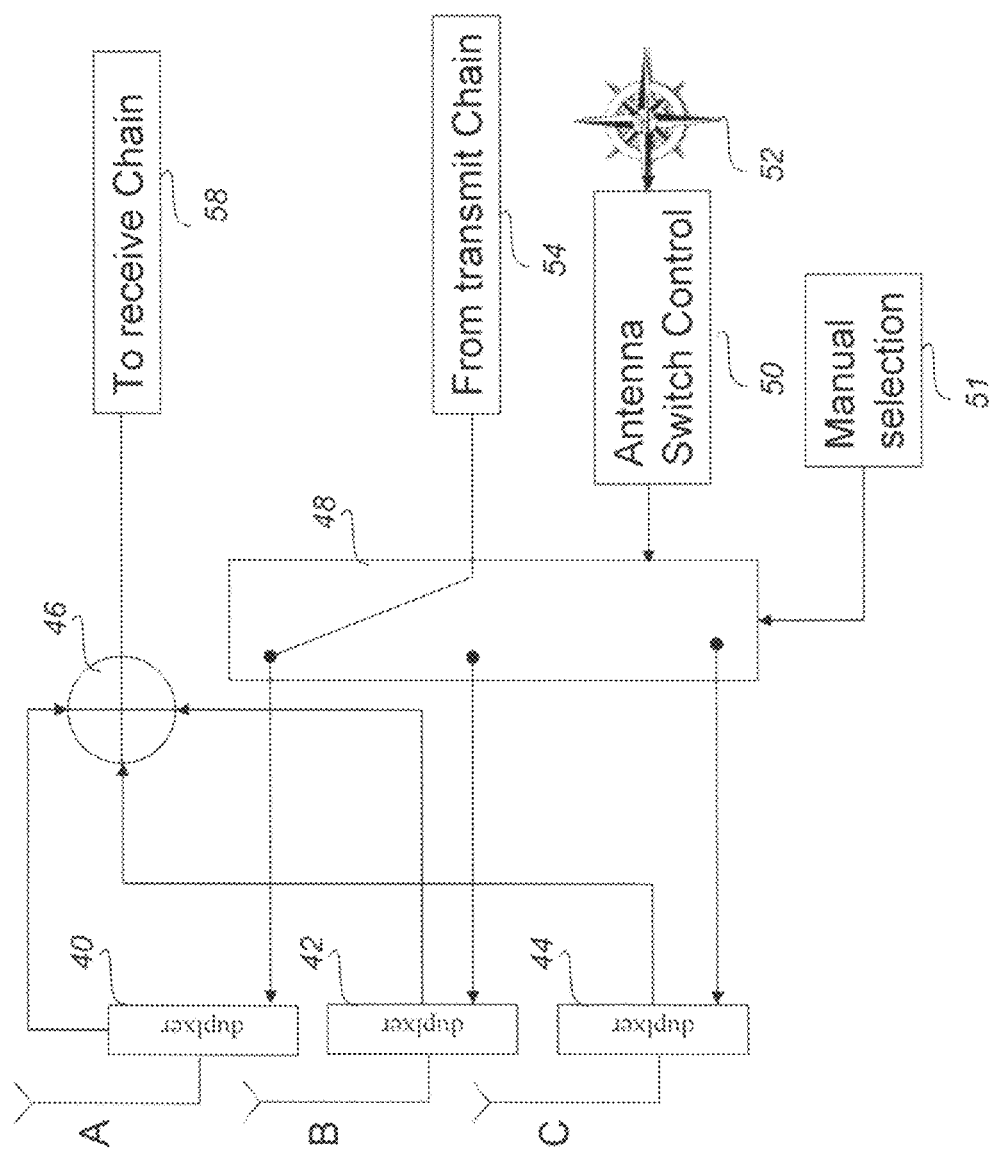
FIG. 3 shows one embodiment of the invention for the FDD where 3 directional antennas are equipped.

Refer to FIG. 3, there are illustrated 3 antennas A, B and C each has responsibility as described in FIG. 2.

In reception chain, all 3 antennas simultaneously receive the signals from all the directions; each received signal will be filtered respectively at 40, 42 and 44. The received 3 signals will be combined in a combining module 46. In this way, the receive chain will not miss those broadcasting system information.

In transmission chain, the digital compass module 52 tracks the angle changes relative to North Pole and pushes the changes to antenna switch control module 50 which will decide which one of the 3 antennas will transmit for the next transmission. In this way, the transmission always towards one of 3 directions, therefore the transmission in desired direction gets enhanced while the undesired directions get reduced.

Figure 5:
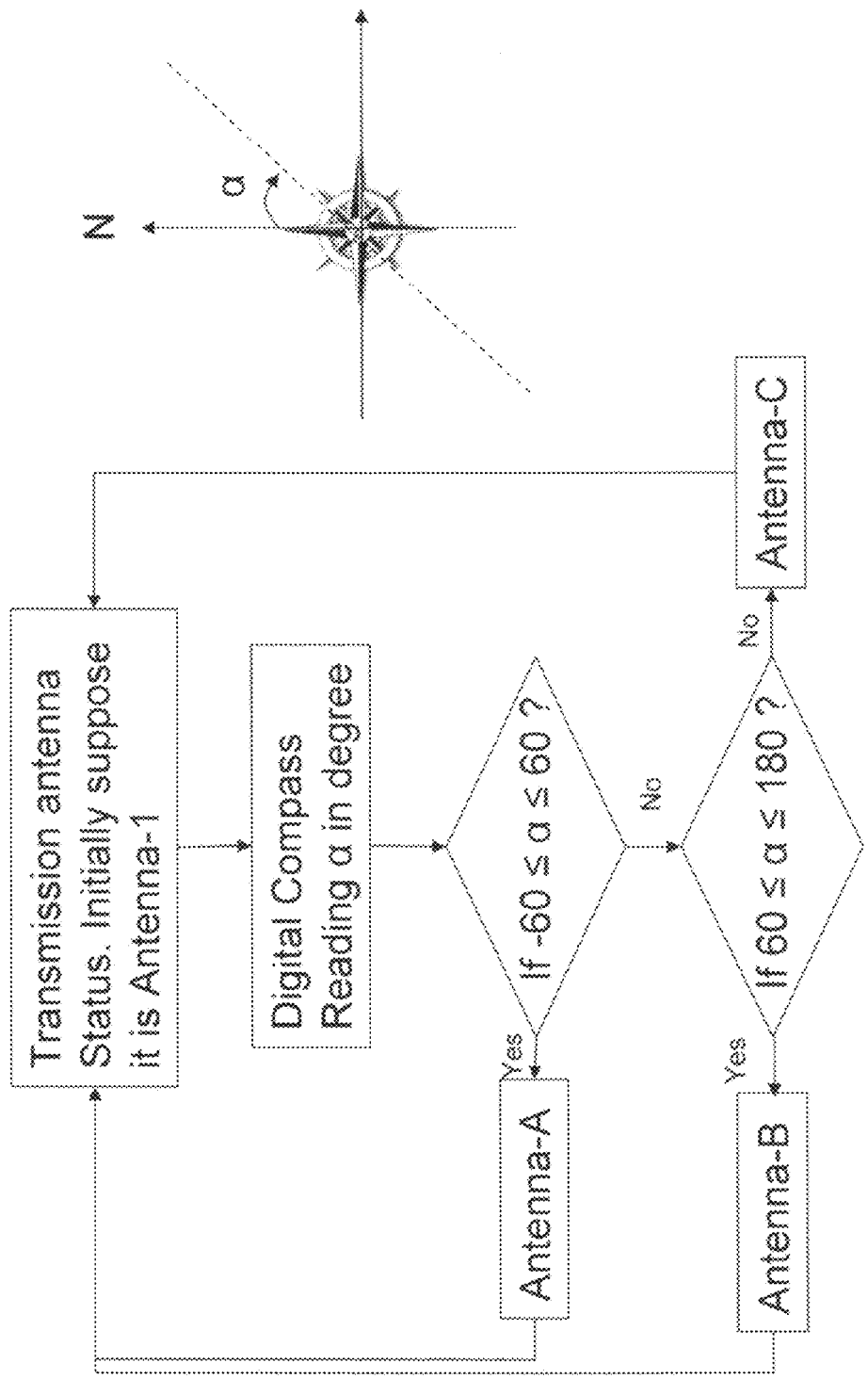
FIG. 5 Illustrates the scheme to select one of the 3 antennas to transmit

Refer to FIG. 5, there is another illustrated embodiment, wherein transmission antenna selection is simply basing on the compass reading. When digital compass module reports angle $\alpha$ is between −60 and 60 degrees, there is no change and antenna A will continue to transmit; When $\alpha$ is between 60 and 180 degrees, antenna B is selected for transmission; all other cases, antenna C will play the role to transmit.

In abnormal situation, user may realize something wrong therefore have to reset the antenna selection manually.

For TDD system, mobile and base stations use the same frequency but transmit and receive at different times.

Figure 4:
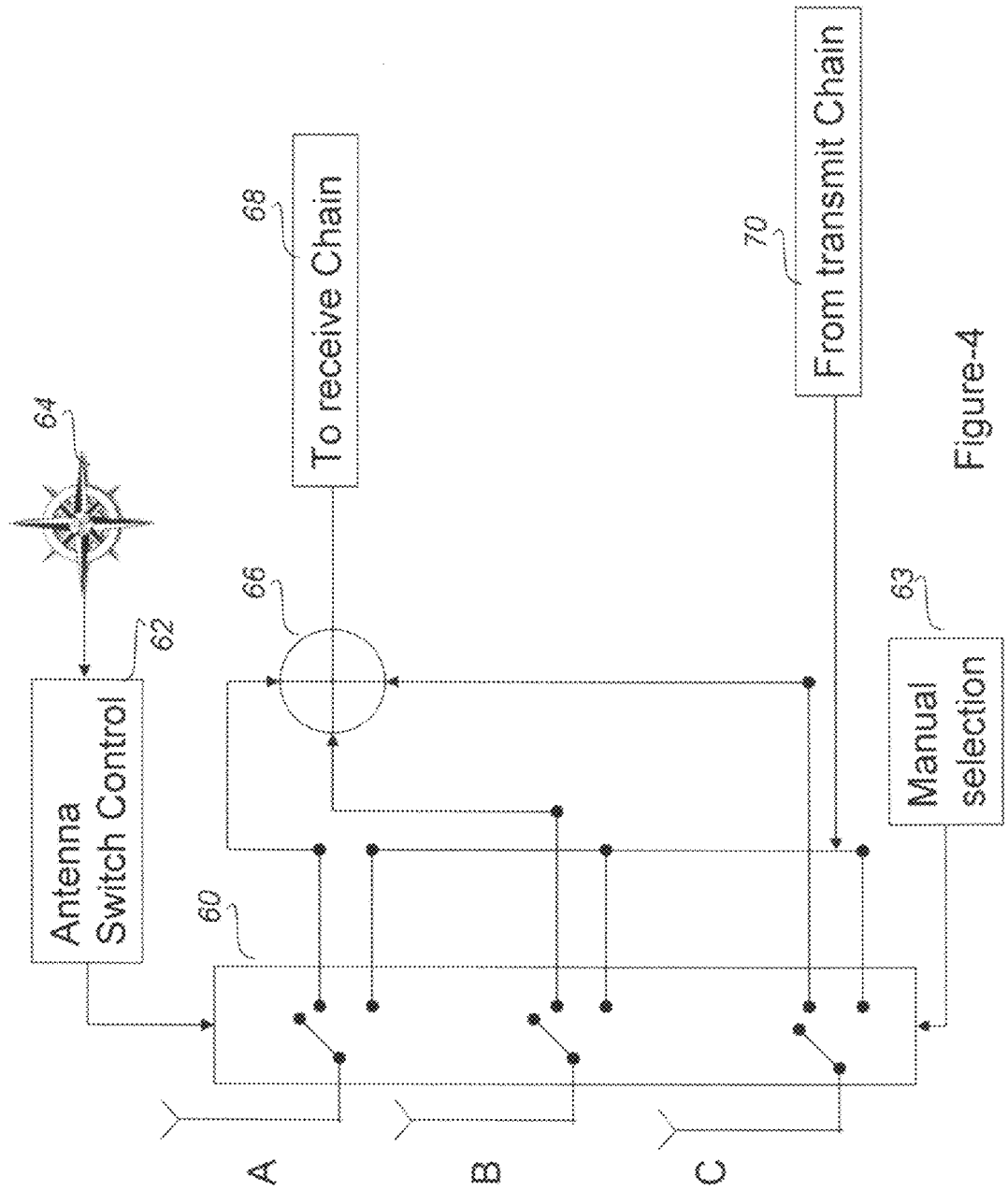
FIG. 4 shows another embodiment of the invention for the TDD system where 3 directional antennas are equipped.

Refer to FIG. 4, there is an illustrated another embodiment, wherein 3 directional antennas A, B and C are oriented in 3 directions and each responsible to cover a space of 120 degrees. The antenna switch module 60 is controlled by antenna switch control unit 62 which makes decision basing on the input of a digital compass (refer FIG. 5).

When in receive mode, all 3 antennas will simultaneously receive from all directions and the received signals will be combined together in the combining module 66 and the combined result will be further processed in other receiver modules. In this way, the receive chain will not miss those system broadcasting information.

When in transmit mode, the antenna switch control module 62 will select one of the 3 antenna basing on the decision procedures as illustrated in FIG. 5 and antenna switch module 60 will connect the selected antenna for transmission and leave other two disconnected. In this way, the transmission always towards one of 3 directions, therefore the transmission in desired direction gets enhanced while the undesired directions get reduced.

When user feels the terminal is not functional well, there is a manual selection module 63 which can reset the antenna for transmission.

I claim:

1. A directional antenna system for wireless terminals comprising:
   a. Three directional antennas, each having an antennas orientation;
   b. A digital compass for regularly measuring the orientation angle changes;
   c. An antenna switch circuitry;
   d. An antenna switch control module for selecting a transmission antenna according to digital compass readings;
   e. A combining circuitry for combining received signals from all antennas from all the directions; and
   f. A manual antenna switch module;
   wherein each directional antenna has a beam pattern that covers a space of 120 degrees; one facing to the North Pole of the compass, another one facing to the South East and yet another one facing to the South West.

2. A directional antenna system for wireless terminals comprising:
   a. Three directional antennas, each having an antennas orientation;
   b. A digital compass for regularly measuring the orientation angle changes;
   c. An antenna switch circuitry;
   d. An antenna switch control module for selecting a transmission antenna according to digital compass readings;
   e. A combining circuitry for combining received signals from all antennas from all the directions; and
   f. A manual antenna switch module;
   wherein each antenna is an omni-directional antenna whose electrical current flow direction is aligned with one of three orthogonal axes z, x and y.

3. The directional antenna system as claimed in claim 1, wherein the three antennas are configured to simultaneously receive in receive mode.

4. The directional antenna system claimed in claim 1, wherein the three antennas are configured for only one being connected for transmission.

5. The directional antenna system as claimed in claim 1, wherein the compass measurement comprises an antenna angle change.

6. The directional antenna system as claimed in claim 1, wherein the compass measurement comprises an antenna angle change $\theta$.

7. The directional antenna system as claimed in claim 1, wherein the compass reports the angle when the change is great than 5 degrees.

8. A directional antenna system for wireless terminals comprising:
   a. Three directional antennas, each having an antennas orientation;
   b. A digital compass for regularly measuring the orientation angle changes:
   c. An antenna switch circuitry;
   d. An antenna switch control module for selecting a transmission antenna according to digital compass readings:
   e. A combining circuitry for combining received signals from all antennas from all the directions; and
   f. A manual antenna switch module;
   wherein the control module has a comparing logic circuit which will compare the input angle a from digital compass with pre-defined threshold values to determine which antenna is used for the next transmission.

9. The directional antenna system as claimed in claim 1, wherein the combining is in analog format and the combined antenna can receive from all the directions.

10. The directional antenna system as claimed in claim 1, wherein the manual switch can select one of the three antennas either by at least one of a wheel, a button or a software interface.

11. The directional antenna system as claimed in claim 2, wherein the three antennas are configured to simultaneously receive in receive mode.

12. The directional antenna system claimed in claim 2, wherein the three antennas are configured for only one being connected for transmission.

13. The directional antenna system as claimed in claim 2, wherein the compass measurement comprises an antenna angle change.

14. The directional antenna system as claimed in claim 2, wherein the compass measurement comprises an antenna angle change $\theta$.

15. The directional antenna system as claimed in claim 8, wherein the compass reports the angle when the change is great than 5 degrees.

16. The directional antenna system as claimed in claim 8, wherein the three antennas are configured to simultaneously receive in receive mode.

17. The directional antenna system claimed in claim 8, wherein the three antennas are configured for only one being connected for transmission.

18. The directional antenna system as claimed in claim 8, wherein the compass measurement comprises an antenna angle change.

19. The directional antenna system as claimed in claim 8, wherein the compass measurement comprises an antenna angle change $\theta$.

20. The directional antenna system as claimed in claim 8, wherein the compass reports the angle when the change is great than 5 degrees.

* * * * *